(12) United States Patent
Morita et al.

(10) Patent No.: US 6,662,100 B2
(45) Date of Patent: Dec. 9, 2003

(54) NAVIGATION SYSTEM

(75) Inventors: Hiroyuki Morita, Saitama (JP); Yukio Miyamaru, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/075,341

(22) Filed: Feb. 15, 2002

(65) Prior Publication Data

US 2002/0116119 A1 Aug. 22, 2002

(30) Foreign Application Priority Data

Feb. 16, 2001 (JP) ........................................ 2001-040012

(51) Int. Cl.⁷ .............................................. G01C 21/00
(52) U.S. Cl. ...................... 701/200; 701/208; 340/988; 340/995
(58) Field of Search ................................. 701/200, 201, 701/202, 206–208; 340/988, 995

(56) References Cited

U.S. PATENT DOCUMENTS 5,340,061 A * 8/1994 Vaquier et al. ............ 701/206
6,453,236 B1 * 9/2002 Aoki ........................... 701/211

FOREIGN PATENT DOCUMENTS

JP      11-29085      2/1999

* cited by examiner

Primary Examiner—Marthe Y. Marc-Coleman
(74) Attorney, Agent, or Firm—Birch, Stewart, Kolasch & Birch, LLP

(57) ABSTRACT

To provide a navigation system for allowing users to register via-points (or waypoints WPs) and reference registered WPs by a simple operation. A navigation system for displaying a navigation guide for navigating a movable body to a predetermined registered via-point includes a WP memory to which a plurality of storage areas for storing positional information of a plurality of via-points (WPs) are allocated. Selector switches are provided for selecting any one of the plurality of storage areas. A display panel displays information for identifying the selected storage area and a navigation guide to a registered via-point stored in the selected storage area. A registration switch is provided for accepting a first operation for starting a registration mode for registering positional information into selected storage area and a second operation for executing the registration of positional information into selected storage area in registration mode.

22 Claims, 7 Drawing Sheets

| WP NUMBER | POSITIONAL INFORMATION |
|---|---|
| 1 | N 35.40.09.00    E 139.43.37.5 |
| 2 | . . . . . . . . . . . . . . . . . . . . . . . |
| 3 | . . . . . . . . . . . . . . . . . . . . . . . |
| 4 | . . . . . . . . . . . . . . . . . . . . . . . |
| ⋮ | ⋮ |
| 9 | . . . . . . . . . . . . . . . . . . . . . . . |

NAVIGATION SYSTEM

CROSS-REFERENCE TO RELATED APPLICATIONS

The nonprovisional application claims priority under 35 U.S.C. §119(a) on Patent Application No. 2001-040012 filed in Japan on Feb. 16, 2001, the entirety of which is herein incorporated by reference.

BACKGROUND OF THE INVENTION

1. Field of the Invention

The present invention relates generally to a navigation system for navigating mobile bodies such as vehicles and walking human beings in a predetermined progress direction. In particular, the present invention relates to a navigation system which is capable of easily registering desired via-points.

2. Description of Background Art

Navigation systems for displaying an optimum route from a start point to a destination by registering them beforehand are in wide use. In addition, a navigation system having a backtrack mode known as product name "Magellan GPS 3000 Satellite Navigator" has been sold (from December 1995 in Japan) from Mazellan System Japan, Inc. In the above system, via-points are sequentially registered as WPs (Waypoints) halfway between a start point and destination. In a return way, the registered WPs are reversely followed to correctly reach the start point along the same route as the outward route. In this backtrack mode, the distance and direction from each WP to another WP to return on a return route are displayed on a display panel.

In the above-mentioned background-art technology, a plurality of storage areas are arranged for storing WP positional information, thereby registering a plurality of WPs.

For WP registration, the user presses the "ENTER" switch to display a function select screen, operates the "Up Arrow" or "Down Arrow" switch to select a WP registration capability, presses the "ENTER" key again to enter the selection, and finally presses the "ENTER" key, upon which the current position is registered as a new WP into any one of the storage areas which stores no WP.

If the free space of the WP memory runs short, the user operates the "MENU" switch, the "Up Arrow" or "Down Arrow" switch to display a list of WP numbers, the "Up Arrow" or "Down Arrow" switch to select the number of a WP to be deleted, the "Up Arrow" or "Down Arrow" switch to select the "DELETE" capability, and finally presses the "ENTER" switch.

The above-mentioned background-art technology does not allow the free selection of WP identification numbers. Accordingly, the user cannot classify as many WPs as desired on the basis of the WP numbers. For example, the user cannot classify WP numbers 1 through 20 for sightseeing and WP numbers 21 through 40 for businesses.

The above-mentioned background-art technology presents another problem. Specifically, if the WP storage area runs short, a WP must be deleted first to allocate a free space. This complicates the operations to be performed by the user.

In addition, another problem with the background-art technology is that, on a return route after registering WPs on an outward route, WP5, WP4, WP3, and so on must be sequentially selected so that WPs can be reversely traced. In order to display the navigation guide up to each of these WPs, it is necessary for the the user to display a list of WPs and repeatedly select the desired WPs by operating "Up Arrow" and "Down Arrow" buttons. Accordingly, the operation to be performed by the user is further complicated.

SUMMARY OF THE INVENTION

It is therefore an object of the present invention to provide a navigation system which, by overcoming the above-mentioned problems, allows the user to register WPs and reference the registered WPs with simple operations.

In carrying out the invention and according to one aspect thereof, there is provided a navigation system for displaying a navigation guide for navigating a movable body to a predetermined registered via-point, comprising: a storage device to which a plurality of storage areas for storing positional information of a plurality of via-points are allocated; a selector switch for selecting any one of said plurality of storage areas; a display for displaying information for identifying the selected storage area and a navigation guide to a registered via-point stored in said selected storage area; and a registration switch for registering positional information into said selected storage area.

According to the above-mentioned novel constitution, the user can select WP storage areas, or WP numbers (identification information), as desired by use of the selector switch. This facilitates the displaying of navigation guides on the basis of the positional information registered in these storage areas, the new registration of positional information into these storage areas, and the control of the WPs based on the WP numbers.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Figures 1, 2:
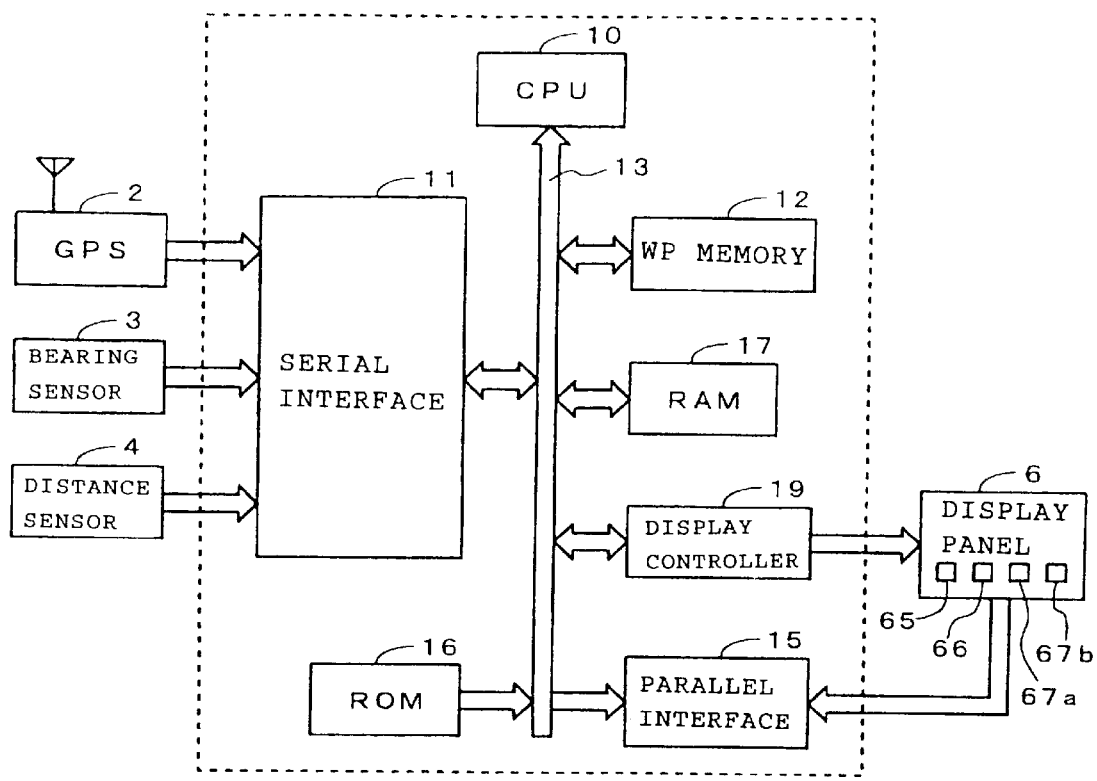
FIG. 1 is a block diagram illustrating a circuit configuration of the main section of a navigation system to which the present invention is applied.
FIG. 2 is a schematic diagram illustrating the storage contents of a WP memory.

The present invention will now be described in further detail by way of example with reference to the accompanying drawings. Referring to FIG. 1, a block diagram illustrates a configuration of the main section of a navigation system to which the present invention is applied. In this example, the navigation system is one which is for use on board a dune buggy; however, it should be understood that the navigation system according to the present invention could be used on any mobile body.

A GPS (Global Positioning System) 2 receives signals from artificial satellites to measure the current position (longitude and latitude) of the vehicle. A bearing sensor 3 detects the current position and bearing of the vehicle. A distance sensor 4 detects a travel distance of the vehicle. The GPS 2, the bearing sensor 3, and the distance sensor 4 are connected to a system bus 13 via a serial interface 11.

On the basis of the information captured from the GPS 2, the bearing sensor 3, and the distance sensor 4 and a control program stored in a ROM 16, a CPU 10 obtains the current position of the vehicle. Furthermore, the CPU 10 computes a positional relationship between the WP registered in a waypoint (WP) memory 12 and the current position of the vehicle. A RAM 17 provides a work area for the CPU 10.

A display panel 6 outputs the directions and distances of the WP and destination as viewed from the current position to the display panel 6 via a display controller 19. Switches 65, 66, 67a, and 67b of the display panel 6 are connected to the system bus 13 via a parallel interface 15.

FIG. 2 schematically illustrates the storage contents of the WP memory 12. As shown, a storage area is allocated to each WP number, which includes WP identification information. Specifically, each allocated storage area stores WP positional information.

Hereinbelow, a position registered in a storage area having WP number "1" is referred to as WP1, a position registered in a storage area having WP number "2" is referred to as WP2, and so on up to WP9. It should be noted that, in the present embodiment, WP1 through WP9 may also be generically referred to as WP. The registration of a WP denotes that the user specified a WP number and registered the positional information into the storage area having the specified WP number.

Figure 3:
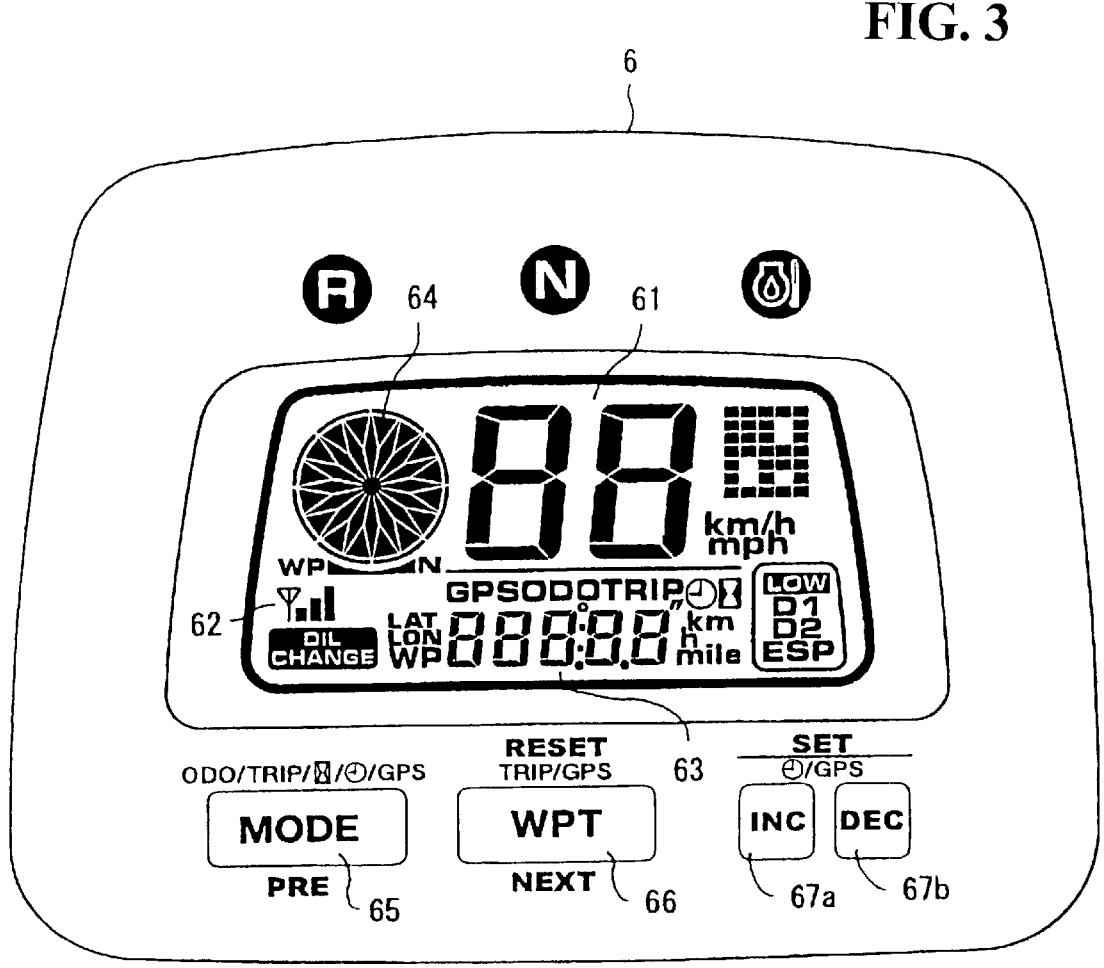
FIG. 3 is a diagram illustrating a configuration of a display panel.

FIG. 3 illustrates a configuration of the display panel 6 which has a speed display section 61, a sensitivity display section 62, a multi display section 63, and a direction display section 64. The sensitivity display section 62 is for displaying a GPS reception status. The multi display section 63 functions as an odometer and a trip meter and displays a currently selected WP number and a distance up to that WP. The direction display section 64 is for displaying the directions of the WP and the destination in 16 bearings.

The display panel 6 also has a "MODE" switch 65, a "WPT" switch 66, an "INC" switch 67a, and a "DEC" switch 67b. The "MODE" switch 65 is for selecting an operation mode of the navigation system. The "WPT" switch 66 is for newly registering the current position into WP. The "INC" switch 67a and the "DEC" switch 67b are for selecting the WP. The other display contents are not necessary for the understanding of the present invention and therefore will not be further described.

Figure 4:
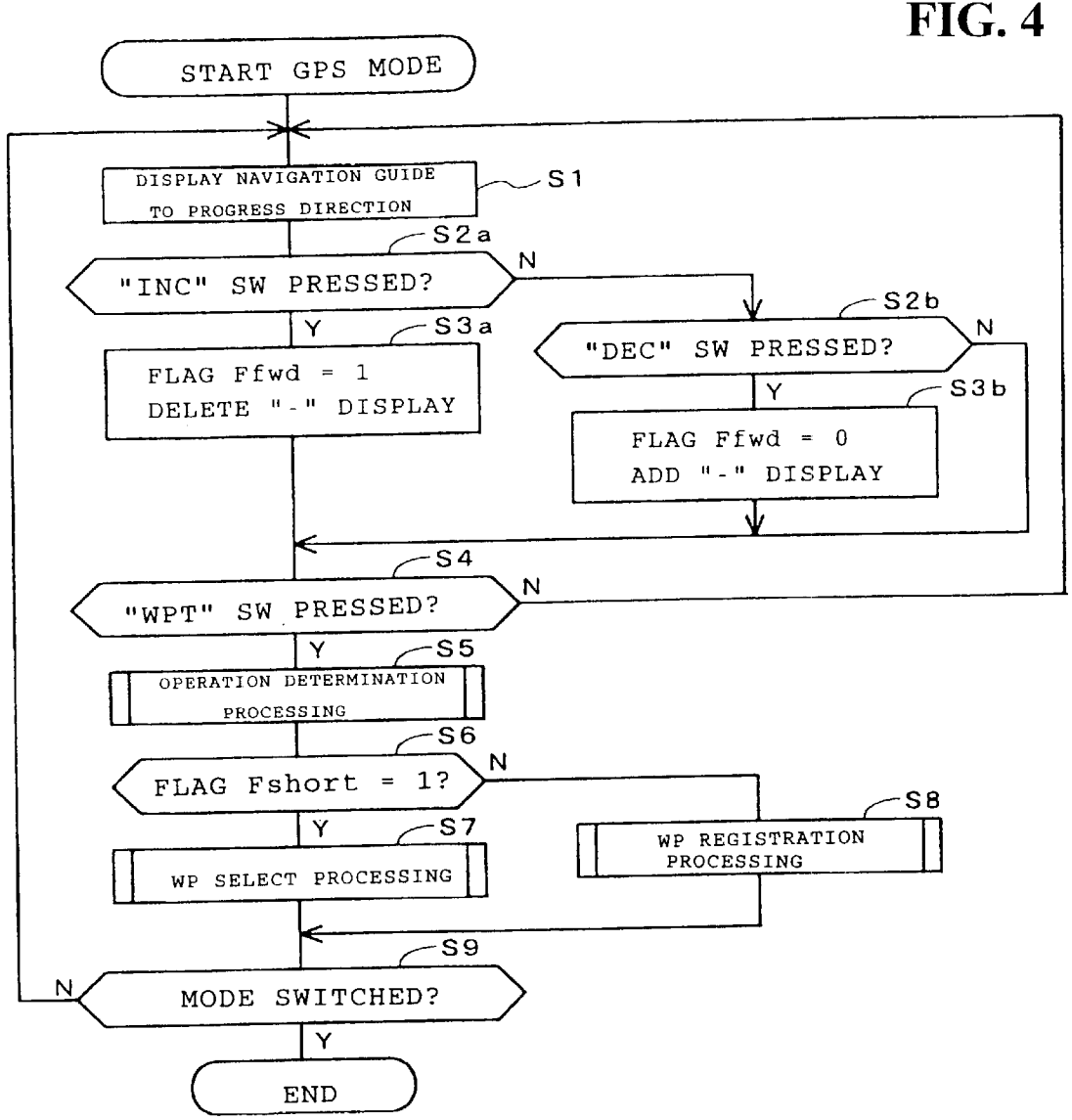
FIG. 4 is a flowchart (1) describing an operation of the present embodiment.
Figure 5:
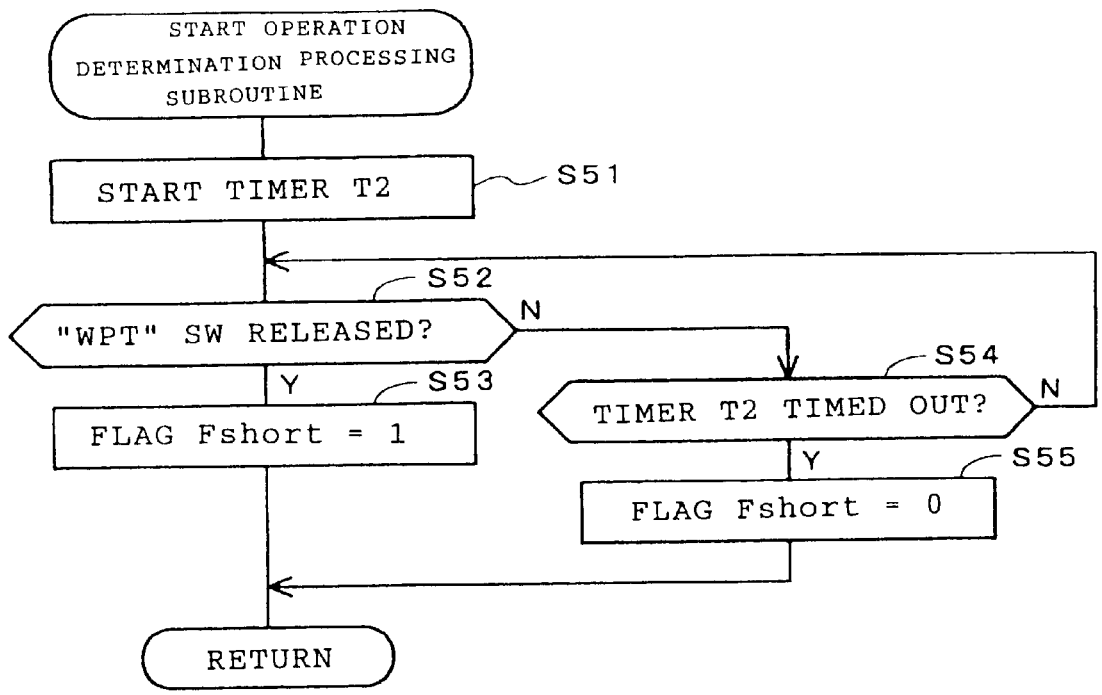
FIG. 5 is a flowchart (2) describing another operation of the present embodiment.
Figure 6:
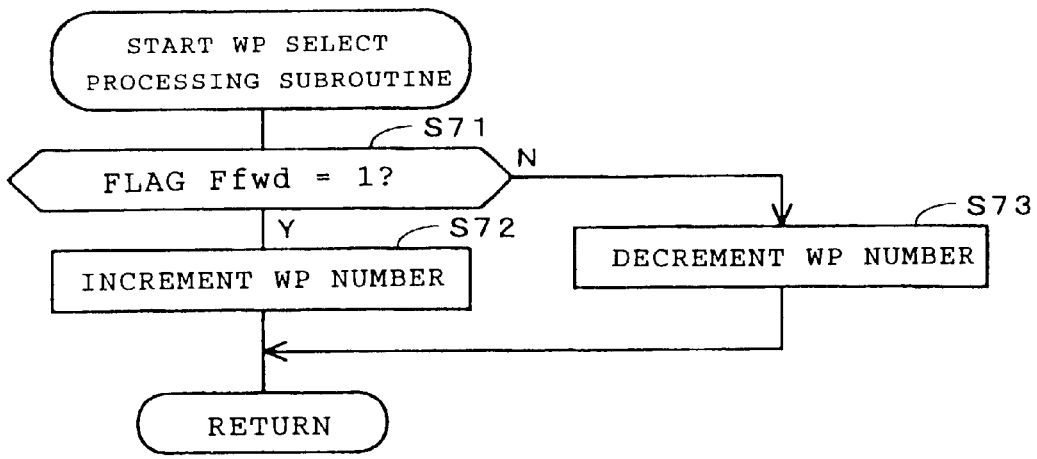
FIG. 6 is a flowchart (3) describing still another operation of the present embodiment.

The following describes a WP registration method in the present embodiment with reference to the flowcharts shown in FIGS. 4, 5, and 6.

When the "MODE" switch 65 of the display panel 6 is pressed to start the GPS mode, the positional information of the WP nearest from the current position or selected in the last GPS mode is retrieved from the WP memory 12 in step S1 shown in FIG. 4.

Figure 8A:
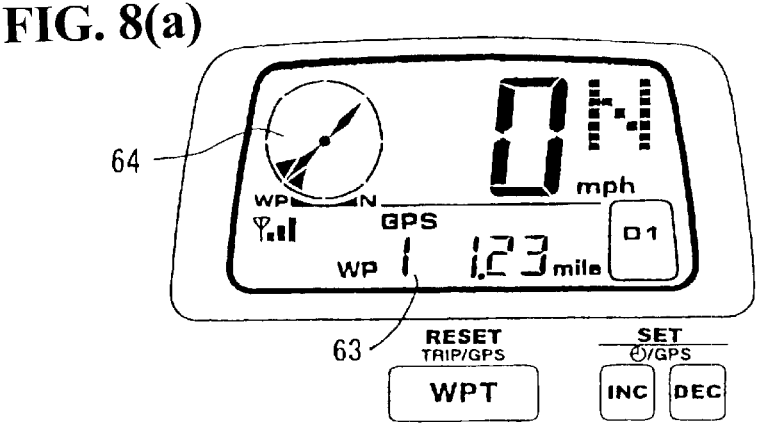
FIGS. 8(*a*) to 8(*d*) are diagrams illustrating exemplary displays on the display panel at the time of WP selection.

FIG. 8(a) illustrates an exemplary display on the display panel 6 when WP1 is selected, in which the selected WP's identification number "1" and distance "1.23 miles" up to WP1 are displayed in the multi display section 63. Furthermore, the direction of WP1 is displayed in the direction display section 64.

In step S2a, whether the "INC" switch 67a has been pressed or not is determined. If this switch is found not pressed, then whether the "DEC" switch 67b has been pressed or not is determined in step S2b. If the "DEC" switch 67b is found pressed, an ascending-order select flag Ffwd is reset in step S3b.

Figure 8B:
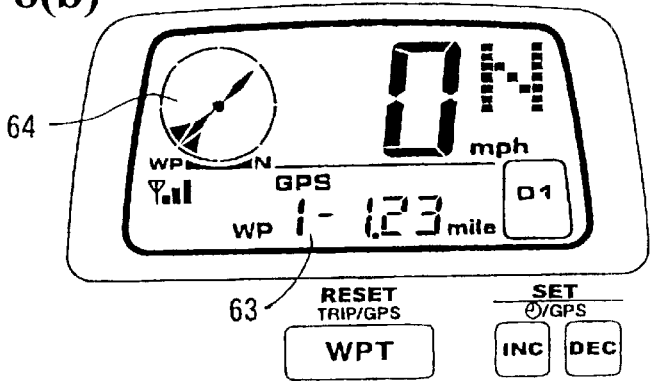

The ascending-order select flag Ffwd, as will be described later, sets the direction in which the WPs to be referenced are selected in ascending order (WP1, WP2, etc.) or descending order (WP9, WP8, etc.) in response to the pressing of the "WPT" button. When the ascending-order select flag Ffwd is reset, the select direction is set to descending order. At this moment, as shown in FIG. 8(b), in the multi display section 63, the "–" symbol is indicative of the selection of the descending-order selection, and which is displayed to the right of the WP number.

If the "INC" switch 67a is found pressed in step S2a, then the ascending-order select flag Ffwd is set in step S3a. Furthermore, if the "–" symbol is displayed, it is deleted.

In step S4, whether the "WPT" switch 66 has been pressed or not is determined. If this switch is found pressed, then the procedure goes to step S5, in which "operation determination processing" is executed.

FIG. 5 is a flowchart describing the "operation determination processing" in which the length of time in which the "WPT" switch 66 is kept pressed is determined.

In step S51, timer T2 starts. In step S52, whether the "WPT" switch 66 has been released or not is determined. If this switch is found released, a short-time pressing flag Fshort is set in step S53.

On the contrary, if the "WPT" switch 66 is found not released in step S52, then whether the timer T2 has timed out or not is determined in step S54. If the timer T2 times out before the "WPT" switch 66 is released, then the short-time pressing flag Fshort is reset in step S55.

Referring to FIG. 4 again, the short-time pressing flag Fshort is referenced in step S6. If the flag Fshort is set, it indicates that the pressing of the "WPT" switch by the operator is short in time, which indicates a WP number select operation, upon which the procedure goes to step S7. In step S7, "WP select processing" is executed.

FIG. 6 is a flowchart describing the operation of the "WP select processing" in which, every time the "WPT" switch 66 is pressed, the WPs to be referenced are selected in ascending or descending order in accordance with the state of the descending-order select flag Ffwd.

Figure 8C:
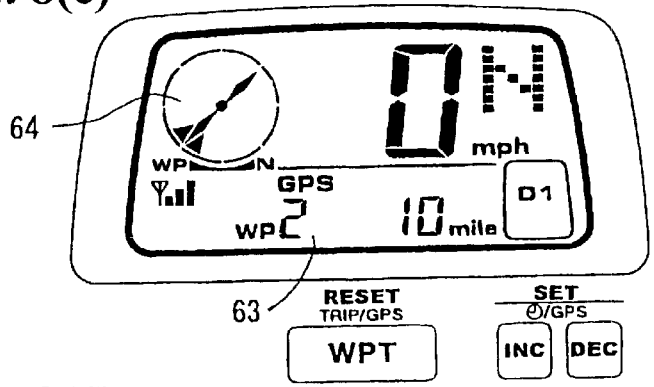

In step S71, the ascending-order select flag Ffwd is referenced. If the flag Ffwd is found set, then the WP number is incremented in step S72, so that the WP to be referenced is switched from WP1 to WP2, for example. Consequently, on the display panel 6, as shown in FIG. 8(c), WP number "2" and "10 (mile)", which is the distance up to WP2, are displayed in the multi display section 63. The direction of WP2 is displayed in the direction display section 64.

Figure 8D:
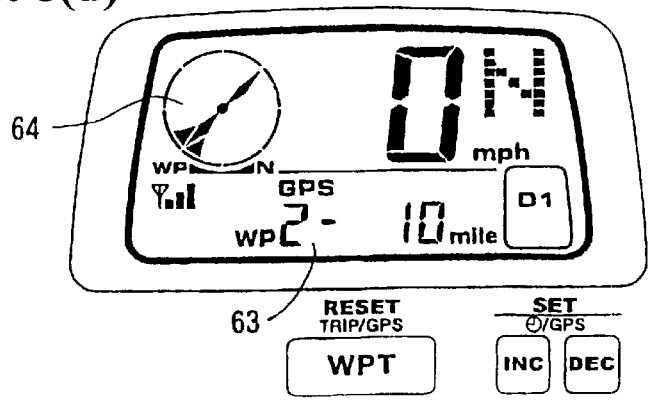

On the contrary, if the ascending-order select flag Ffwd is found reset, then the WP number is decremented in step S73 and the WP to be referenced is switched from WP3 to WP2, for example. Consequently, on the display panel 6, as shown in FIG. 8(d), WP number "2" and "10 (mile)" which is the distance up to WP2, are displayed in the multi display section 63. The direction of WP2 is displayed in the direction display section 64.

Referring to FIG. 4 again, if the short-time pressing flag Fshort is found reset in step S6, it indicates that the pressing of the "WPT" switch 66 by the operator is long in time, which indicates that a registration operation has been performed, upon which the procedure goes to step S8. In step S8, "WP registration processing" is executed.

Figure 7:
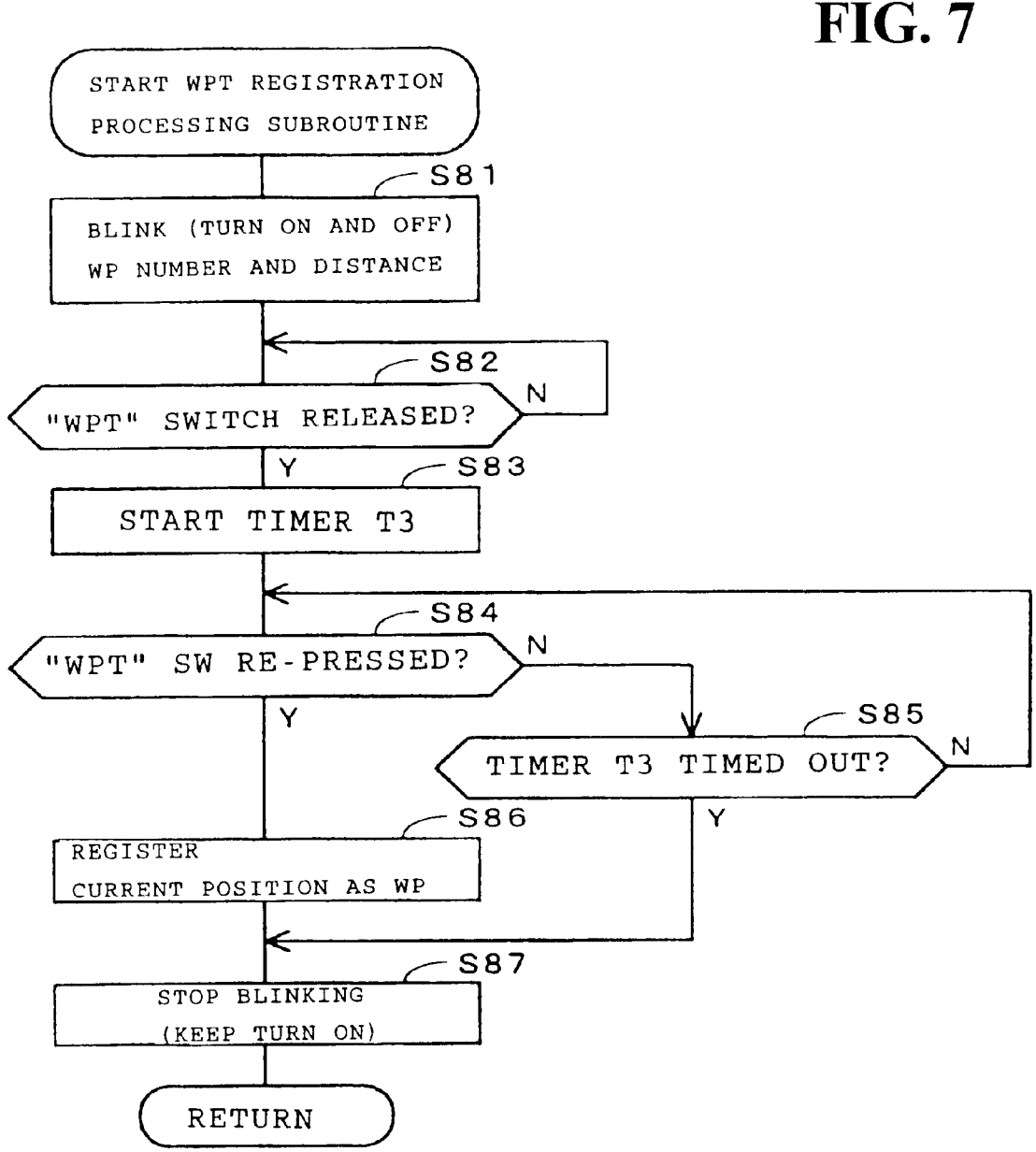
FIG. 7 is a flowchart (4) describing yet another operation of the present embodiment.
Figure 9A:
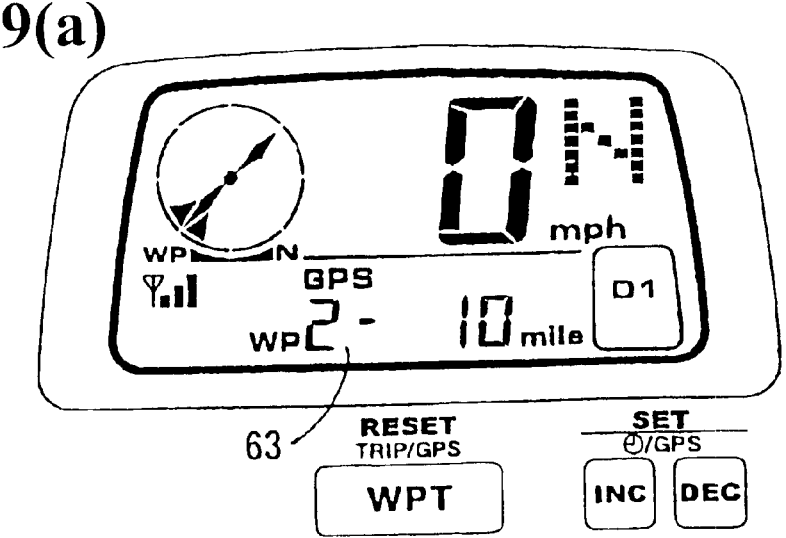
FIGS. 9(a) to 9(c) are diagrams illustrating exemplary displays on the display panel at the time of WP registration.

FIG. 7 is a flowchart describing an operation of the "WP registration processing" in which the current position is newly registered in the currently referenced WP. It should be noted that this operation will be described with the state of the display panel 6 at this moment as shown in FIG. 9(a).

Figure 9B:
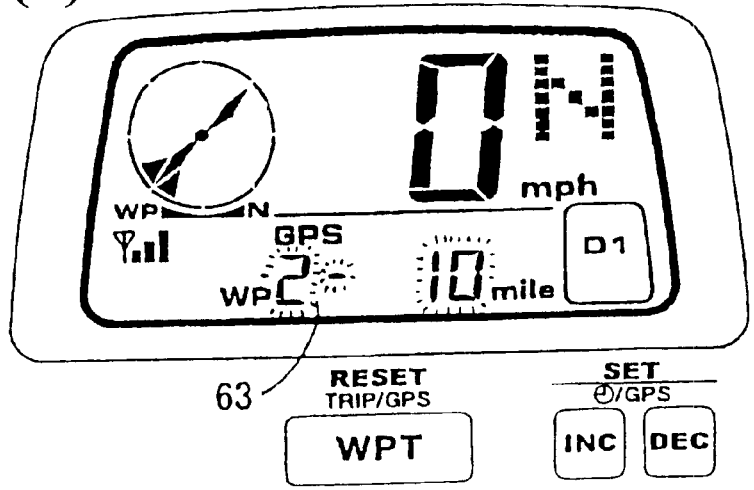

In step S81, as shown in FIG. 9(b), WP number "2–" and distance "10 (mile)" from that WP to the current position are blinked (turned on and off rapidly) in the multi display section 63. In step S82, whether the "WPT" switch 66 has been released or not is determined. If this switch is found released, then timer T3 starts in step S83.

In step S84, whether the "WPT" switch 66 has been re-pressed or not is determined. Unless the switch is found re-pressed, the procedure goes to step S85. In step S85, whether the timer T3 has timed out or not is determined. If the timer T3 times out before the re-pressing of the "WPT" switch 66, the procedure goes to step S87. In step S87, the blinking mentioned above is stopped, upon which the WP registration processing comes to an end.

Figure 9C:
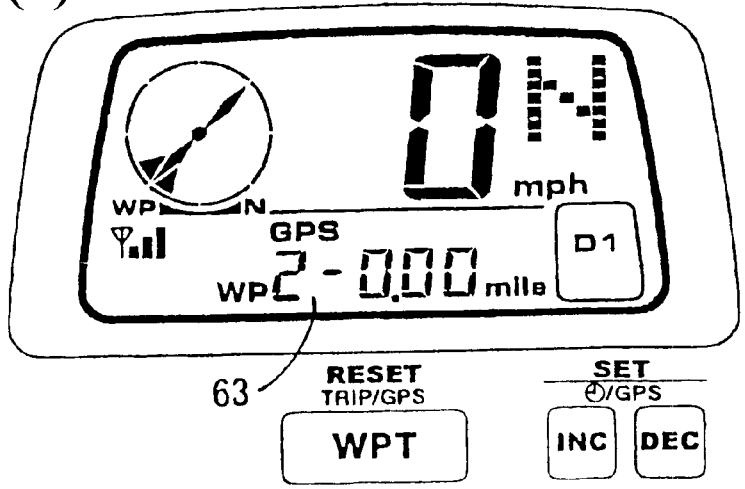

On the other hand, if the "WPT" switch 66 is found re-pressed in step S84, then the positional information of the current information is newly registered in the currently referenced WP. In step S87, the blinking shown in FIG. 9(c) is stopped, upon which the WP registration processing comes to an end. At this moment, the multi display section 63 displays "0.00" which is the distance between the current position and WP2 (namely, the current position).

Referring to FIG. 4 again, in step S9, whether or not the "MODE" switch 65 has been pressed to select an operation mode is determined. Until the operation mode selection is performed, the procedure returns to step S1 to repeat the above-mentioned processing operations.

According to the present embodiment, the user can select any desired identification number, or WP number, assigned to the WPs to be registered, thereby facilitating the management of the WPs.

According to the present embodiment, on the return route after registering WPs on an outward route, first pressing the "DEC" switch can decrement the WP numbers by one only by subsequently pressing the "WPT" switch, so that the navigation guides to WP9, WP8, WP7, and so on can be sequentially displayed with a simple operation.

Likewise, on the second or subsequent outward route, pressing the "INC" switch first beforehand can increment the WP numbers by one only by subsequently pressing the "WPT" switch, so that the navigation guides to WP1, WP2, WP3, and so on can be sequentially displayed with a simple operation.

Furthermore, according to the present embodiment, the "DEC" switch and the "INC" switch may be operated only once first on each return route or the second or subsequent outward route, resulting in a difference in the frequency of switch operation with the "WPT" switch. Therefore, by making the "DEC" switch and the "INC" switch smaller in size, which are lower in operation frequency, the "WPT" switch, which is higher in operational frequency, can be made larger in size. This enhances the ease of use of the switches.

Still further, according to the present embodiment, selecting a desired WP number and registering the selection writes the positional information of a current position over the already registered positional information. This makes it unnecessary for the user to delete the already registered positional information.

As described and according to the invention, the following effects are provided:

The user can select any desired WP storage area, namely WP number (identification information), by use of the selector switch. This facilitates the displaying of navigation guides based on the positional information already registered in these storage areas and the newly registering positional information into these storage areas and the managing of the WPs based on the WP numbers.

First pressing the "DEC" switch beforehand on a return route after WP registration on the outward route can decrement the WP numbers by one only by subsequently pressing the "WPT" switch. This allows the user to sequentially display the navigation guides to WP9, WP8, WP7, and so on by a simple operation.

On the second or subsequent outward route, first pressing the "INC" switch beforehand can increment the WP numbers by one only by subsequently pressing the "WPT" switch. This allows the user to sequentially display the navigation guides to WP1, WP2, WP3, and so on by a simple operation.

The "DEC" switch and the "INC" switch may be operated only once first on the return route or the second or subsequent outward route, which results in a difference in the frequency of operation with the "WPT" switch. Therefore, by making the "DEC" switch and the "INC" switch smaller in size, which are lower in operation frequency, the "WPT" switch, which is higher in operational frequency, can be made larger in size. This enhances the ease of use of the switches.

Selecting a desired WP number and registering the selection writes the positional information of a current position over the already registered positional information. This makes it unnecessary for the user to delete the already registered positional information.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A navigation system for displaying a navigation guide for navigating a movable body to a predetermined registered via-point, comprising:
   storage means to which a plurality of storage areas for storing positional information of a plurality of via-points are allocated;
   a selector means for selecting any one of said plurality of storage areas;
   display means for displaying information for identifying the selected storage area and a navigation guide to a registered via-point stored in said selected storage area; and a registration means for registering positional information into said selected storage area.

2. The navigation system according to claim 1, wherein said registration means accepts a first operation for starting a registration mode for registering positional information into said selected storage area and a second operation for executing the registration of positional information into said selected storage area in said registration mode.

3. The navigation system according to claim 2, wherein said registration mode blinks at least one of the displays of said storage area identification information and said navigation guide.

4. The navigation system according to claim 3, wherein said registration mode comes to an end if said second operation is not performed within a predetermined period of time.

5. The navigation system according to claim 2, wherein said registration mode comes to an end if said second operation is not performed within a predetermined period of time.

6. The navigation system according to claim 1, wherein said registration mode blinks at least one of the displays of said storage area identification information and said navigation guide.

7. The navigation system according to claim 6, wherein said registration mode comes to an end if said second operation is not performed within a predetermined period of time.

8. The navigation system according to claim 1, wherein any one of said plurality of storage areas is sequentially selected in response to an operation of said selector means.

9. The navigation system according to claim 8, wherein said selector means includes a first selector means for sequentially selecting any one of said plurality of storage areas in one direction and a second selector means for sequentially selecting any one of said plurality of storage areas in other direction.

10. The navigation system according to claim 1, wherein said positional information registered into said selected storage area corresponds to a current position of the movable body.

11. The navigation system according to claim 1, wherein said registration means overrides said positional information in said selected storage area with positional information corresponding to a current position of the movable body.

12. A navigation system for displaying a navigation guide for navigating a movable body to a predetermined registered via-point, comprising:

a storage device, said storage device including a plurality of storage areas for storing positional information of a plurality of via-points, respectively;

a selector switch for selecting any one of said plurality of storage areas;

a display, said display displaying information for identifying the selected storage area and a navigation guide to a registered via-point stored in said selected storage area; and a registration switch, said registration switch registering positional information into said selected storage area.

13. The navigation system according to claim 12, wherein said registration switch accepts a first operation for starting a registration mode for registering positional information into said selected storage area and a second operation for executing the registration of positional information into said selected storage area in said registration mode.

14. The navigation system according to claim 13, wherein said registration mode blinks at least one of the displays of said storage area identification information and said navigation guide.

15. The navigation system according to claim 14, wherein said registration mode comes to an end if said second operation is not performed within a predetermined period of time.

16. The navigation system according to claim 13, wherein said registration mode comes to an end if said second operation is not performed within a predetermined period of time.

17. The navigation system according to claim 12, wherein said registration mode blinks at least one of the displays of said storage area identification information and said navigation guide.

18. The navigation system according to claim 17, wherein said registration mode comes to an end if said second operation is not performed within a predetermined period of time.

19. The navigation system according to claim 12, wherein any one of said plurality of storage areas is sequentially selected in response to an operation of said selector switch.

20. The navigation system according to claim 19, wherein said selector switch includes a first selector switch for sequentially selecting any one of said plurality of storage areas in one direction and a second selector switch for sequentially selecting any one of said plurality of storage areas in other direction.

21. The navigation system according to claim 12, wherein said positional information registered into said selected storage area corresponds to a current position of the movable body.

22. The navigation system according to claim 12, wherein said registration switch overrides said positional information in said selected storage area with positional information corresponding to a current position of the movable body.

* * * * *